United States Patent [19]

Buerkel

[11] Patent Number: 4,682,046

[45] Date of Patent: Jul. 21, 1987

[54] POSITIVE OR NEGATIVE VOLTAGE POWER SUPPLY WITH SLIDEABLE CARRIER SWITCHING MECHANISM

[75] Inventor: David H. Buerkel, Wayne, Pa.

[73] Assignee: Applied Energy Systems, Inc., Malvern, Pa.

[21] Appl. No.: 892,670

[22] Filed: Aug. 1, 1986

[51] Int. Cl.[4] .............................. H02J 1/00
[52] U.S. Cl. ..................... 307/138; 200/16 B; 219/137 PS; 361/342
[58] Field of Search ............. 219/137 PS; 307/19, 307/23, 43, 52, 72, 80, 138; 361/342; 200/16 B, 16 E

[56] References Cited

U.S. PATENT DOCUMENTS

| | | |
|---|---|---|
| 950,107 | 2/1910 | Larsson . |
| 2,218,555 | 10/1940 | Rossman . |
| 2,762,015 | 9/1956 | McGrath .............................. 361/246 |
| 2,762,878 | 9/1956 | Wills ..................................... 200/50 |
| 2,767,266 | 10/1956 | Hawkins et al. ..................... 361/338 |
| 2,980,824 | 4/1961 | Kobryner . |
| 3,247,445 | 4/1966 | Vaughan ............................. 361/245 |
| 3,274,356 | 9/1966 | Godfrey .............................. 200/114 |
| 3,295,025 | 12/1966 | Tjebben ............................... 361/337 |
| 3,316,452 | 4/1967 | Barlow . |
| 3,343,042 | 9/1967 | Cellerini et al. . |
| 3,440,371 | 4/1969 | Netzel et al. ........................ 200/50 |
| 3,452,211 | 6/1969 | Buerkel ............................... 307/24 |
| 3,573,561 | 4/1971 | Beebe . |
| 3,610,850 | 10/1971 | Eichelberger ................... 200/50 AA |
| 3,626,253 | 12/1971 | Sturdivan ......................... 339/258 R |
| 3,703,621 | 11/1972 | Viola et al. ........................ 200/16 E |
| 3,800,103 | 3/1974 | Hardi-Kern ........................... 200/1 U |
| 3,823,288 | 7/1974 | Wilson ............................... 200/144 R |
| 3,903,384 | 9/1975 | DeVisser .......................... 200/16 E |
| 3,914,659 | 10/1975 | May et al. ............................ 361/337 |
| 3,957,333 | 5/1976 | Kaminsky ........................... 339/32 R |
| 4,020,301 | 4/1977 | Ericson et al. ................. 200/50 AA |
| 4,184,191 | 1/1980 | Jinnai ................................... 361/336 |
| 4,185,561 | 1/1980 | Reyman .............................. 307/138 |
| 4,204,243 | 5/1980 | Ross ..................................... 361/246 |
| 4,317,160 | 2/1982 | Tilison et al. ....................... 361/339 |
| 4,482,936 | 11/1984 | Saito .................................... 361/336 |
| 4,531,174 | 7/1985 | Rickmann .......................... 361/339 |
| 4,563,549 | 1/1986 | Lycan .................................. 200/16 E |

FOREIGN PATENT DOCUMENTS

| | | |
|---|---|---|
| 205981 | 4/1956 | Australia . |
| 3013517 | 10/1981 | Fed. Rep. of Germany . |
| 109149 | 8/1979 | Japan . |

Primary Examiner—William H. Beha, Jr.
Attorney, Agent, or Firm—Caesar, Rivise, Bernstein, Cohen & Pokotilow, Ltd.

[57] ABSTRACT

An electrical apparatus for regulating voltage polarity including a support for slidably receiving one or more carriers therein, with each carrier including circuitry. A positive and negative source of power is associated with the apparatus and each of the carriers includes connector means for coupling each carrier to the positive source of power when the carrier is in a first position, and for coupling each carrier to the negative source of power when the carrier is in a second position. In a preferred embodiment of the invention means are provided for preventing either intentional or accidental movement of the carriers from one of the first and second positions to the other position during operation of the carriers. Preferably a bridging connector is provided for coupling the circuitry of adjacent carriers to each other when the carriers are in a first position coupled to the positive source of power.

9 Claims, 9 Drawing Figures

POSITIVE OR NEGATIVE VOLTAGE POWER SUPPLY WITH SLIDEABLE CARRIER SWITCHING MECHANISM

BACKGROUND OF THE INVENTION

This invention relates generally to an electrical control apparatus, and more specifically to an electrical control apparatus for controlling both the amperage and polarity of electric current as may be used, for example, in welding apparatus, and more particularly in connection with multi-operator welding systems.

Dual polarity welding control systems are known in the prior art. One such system, sold under the trademark SUPER GOLIATH by Neoweld Corporation, includes a handle extending out through the front panel to permit reversal of polarity, as needed or desired.

Unfortunately, while a welding operation is being performed by a welding specialist his or her fellow employees may either playfully, or inadvertently switch the voltage polarity. In addition to upsetting the operator, this switching of polarity can burn out circuit components of the control system, thereby necessitating expensive repair or replacement of the device.

In multi-operator welding systems a number of control panels are mounted in a stationary frame member, to permit a number of operators to simultaneously perform welding operations. In some instances the maximum current output from a single control panel is not adequate to perform a required welding operation, thereby requiring that additional current somehow be introduced into the system. This often is required when welding under positive polarity conditions, but is not required when welding under negative potential conditions. A need is believed to exist for a simple, reliable system for permitting multiple, adjacent control panels to be electrically connected, or "ganged" together, when welding under positive polarity conditions, while preventing the shorting of the system when such adjacent control panels are being operated under different polarity conditions.

The following patents may be deemed relevant to the subject invention:

| U.S. PAT. NOS. | |
|---|---|
| 814,332 | 3,573,561 |
| 950,107 | 3,610,850 |
| 2,218,555 | 3,626,253 |
| 2,353,518 | 3,703,621 |
| 2,762,015 | 3,800,103 |
| 2,762,878 | 3,823,288 |
| 2,767,266 | 3,903,384 |
| 2,980,824 | 3,914,659 |
| 3,247,445 | 3,957,333 |
| 3,274,356 | 4,020,301 |
| 3,295,025 | 4,184,191 |
| 3,316,452 | 4,204,243 |
| 3,343,042 | 4,317,160 |
| 3,440,371 | 4,482,936 |
| 3,452,211 | 4,531,174 |
| | 4,563,549 |
| FOREIGN PATENTS | |
| 205,981 | Australia |
| DE 3,013,517 A1 | Germany |
| 54-109149 | Japan |

OBJECT OF THE INVENTION

It is a general object of this invention to provide an electrical apparatus for selectively providing voltages of different polarity in a simple and reliable manner, without requiring the use of externally engageable levers or similar switches.

It is a further object of this invention to provide an electrical apparatus for selectively providing voltages of different polarity in which both the intentional and inadvertent switching of polarity is precluded while the electrical apparatus is in use.

It is a further object of this invention to provide an electrical control apparatus having the capability of providing a wide range of current outputs so as to be usable in welding and similar applications.

It is a further object of this invention to provide a multi-station welding system wherein at least two control panels can be electrically interconnected together to increase the amperage available for a welding operation.

It is a futher object of this invention to provide a welding control system operable under either positive or negative polarity conditions, and which cannot either inadvertently or intentionally be switched in polarity during a welding operation.

It is a further object of this invention to provide a welding control system wherein the welding potential can be shifted between positive and negative polarities without the use of external, mechanical switches.

SUMMARY OF THE INVENTION

The above and other objects of this invention are achieved in an electrical apparatus for selectively providing voltages of different polarity employing a fixed support and a carrier having circuitry therein slidably mounted on said support for movement between first and second positions. A positive and a negative source of power are provided, and conductor means on the carrier is provided for coupling the positive source of power to the circuitry of the carrier when the carrier is in its first position, and for coupling the negative source of power to the circuitry of the carrier when the carrier is in its second position, whereby polarity is reversed by sliding the carrier on the support between said first and second positions.

In accordance with a preferred embodiment of this invention an interlock system is provided for preventing movement of the carrier from one of said first and second positions to the other of said first and second positions while the carrier is being employed to carry out an operation, such as a welding operation. Most preferably this is achieved by providing a safety and interlocking lever which, in its operative position, locks the carrier to the support to prevent relative sliding movement between said carrier and support. The lever also cooperates with a cable of an electrical tool connected to the carrier during use of the carrier, for preventing movement of the lever out of its operative position, thereby preventing sliding movement of the carrier relative to the support during use of the carrier.

In accordance with still a further aspect of this invention a "ganging" connector system is employed for interconnecting adjacent control units, to thereby make available to an operating tool the current capacity of the adjacent, ganged units.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

Figure 1:
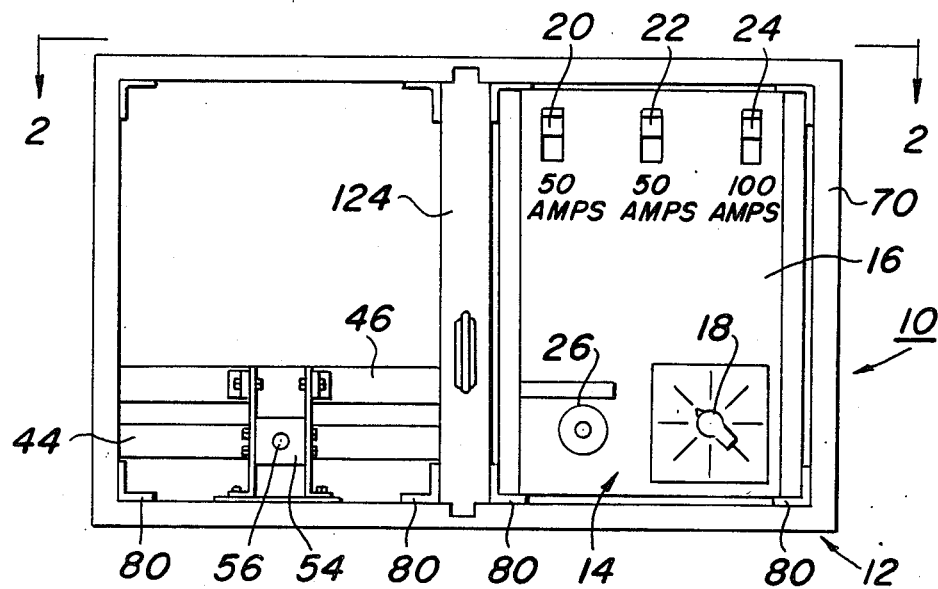
FIG. 1 is a front elevational view of a multi-station welding system with one of the welding control panels omitted to show certain details of construction.

Referring now in greater detail to the various figures of the drawings wherein like reference characters refer to like parts, an electrical control apparatus embodying the present invention is generally shown at 10 in FIG. 1. The device 10 basically comprises a support 12 in which one or more carriers 14, in the form of control panels having conventional circuitry for permitting welding current to be varied, is (are) slidably mounted between first and second positions to connect the carrier(s) to positive and negative potentials, respectively.

Figure 2:
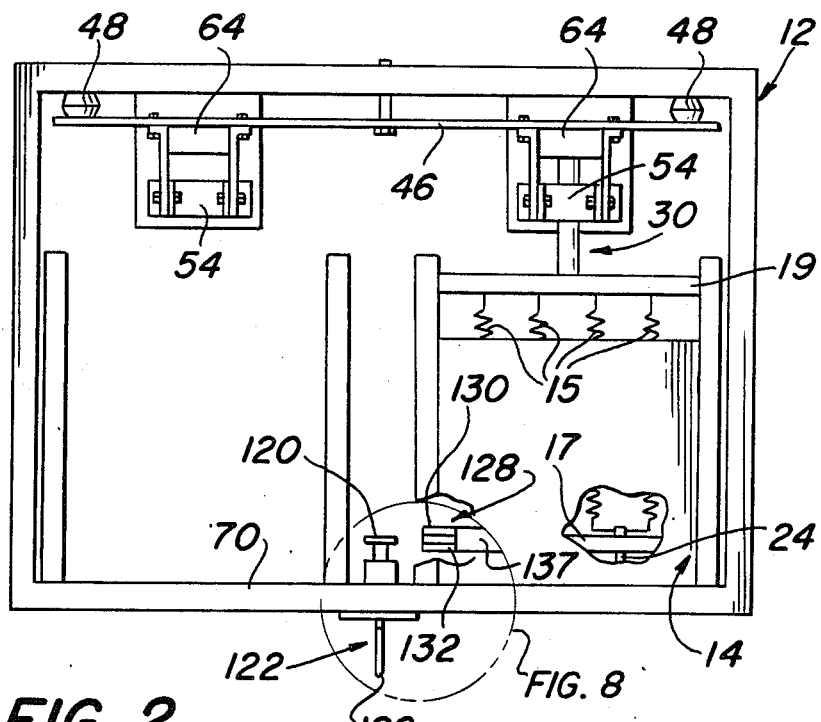
FIG. 2 is a plan view of the apparatus with the top wall omitted to show details of construction.

Referring to FIGS. 1 and 2, the support 12 illustrated herein is adapted to slidably receive two control panels 14 therein. However, for purposes of simplicity, and in order to show certain details of construction, only one control panel 14 is shown in the support 12.

The carrier or control panel 14 can be a conventional welding control unit of the type shown at 35 in U.S. Pat. No. 3,452,211, issued to Buerkel. The Buerkel patent is herein incorporated by reference.

By way of brief explanation the control unit 14 includes a plurality of resistive elements in the form of resistor coils 15, secured between opposed front and rear conductive plates 17 and 19, respectively, through suitable current control switches to be described hereinafter. These conductive plates are bus connections for the plurality of resistors, with a welding tool (not shown) adapted to be electrically connected to the front conductive plate 17, and a power input voltage adapted to be connected to the rear conductive plate 19. The manner in which power is introduced to the rear conductive plate 19 constitutes one of the unique aspects of the present invention.

Referring now specifically to FIG. 1, a front panel 16 of the control device 14 includes conventional control elements; namely, a dial 18 adapted to vary amperage supply to a welding tool from five (5) amperes to fifty (50) amperes in increments of five (5) amperes. In addition, a series of switches 20, 22 and 24 are provided for providing a total of two hundred additional amperes in a minimum of fifty (50) amperes increments. The front panel further includes an output socket 26 into which a cable 28 (FIGS. 6 and 7) of a welding device (not shown) is removably inserted for carrying out a welding operation.

Turning to FIGS. 2 through 5, the power input to the control unit 14 is effected through a conductive rod-like member, or connector, 30 extending rearwardly from the unit and including a radially-enlarged conductive tip or head 32 at the rearmost end thereof. The conductive member 30 further includes an elongate body section 34, about which an insulating layer 36 is provided. The diameter of the body member 34 with the insulating layer 36 is less than the diameter of the conductive tip 32.

The conductive member 30 is connected to a horizontal conductive plate 38 which, in turn, is connected to the rear conductive plate 19 by insulating members 40. The rear conductive plate 19, which constitutes the input bus to the various resistors 15 described earlier, is electrically connected to the horizontal conductive plate 38 by an interconnecting conductive fuse link 42. Thus, the conductive rod-like member 30 is electrically connected to the circuit components of the control unit through the horizontal conductive plate 38 and the interconnecting conductive bracket 42.

Figure 3:
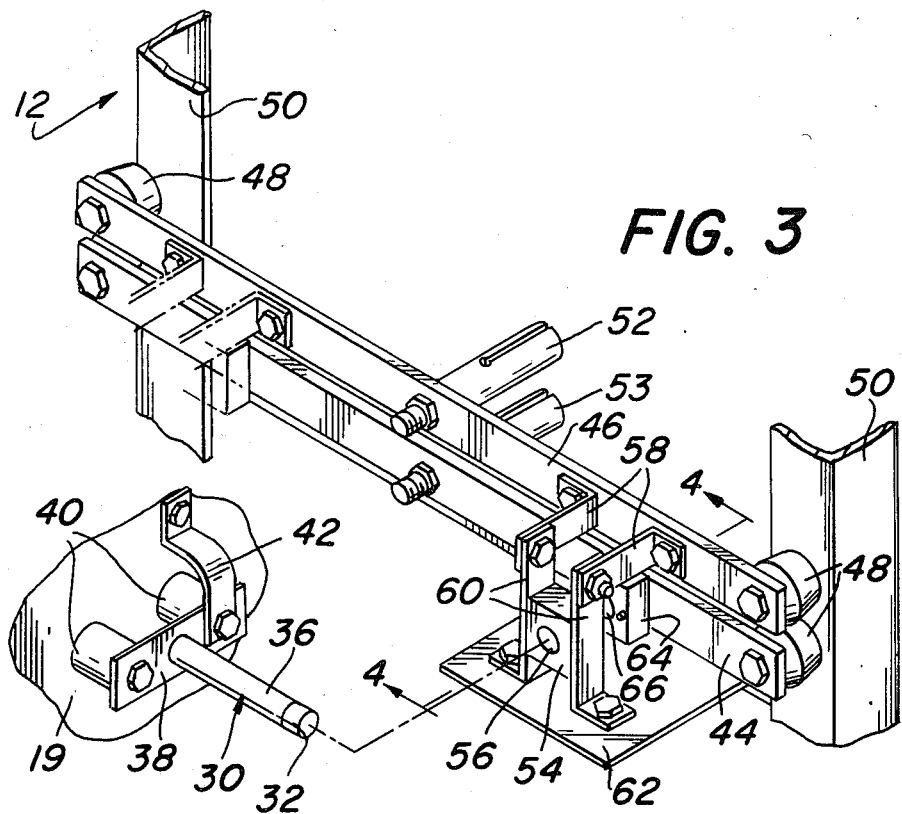
FIG. 3 is a fragmentary exploded isometric view showing certain details for establishing both positive and negative polarities in a control unit of this invention.
Figure 4:
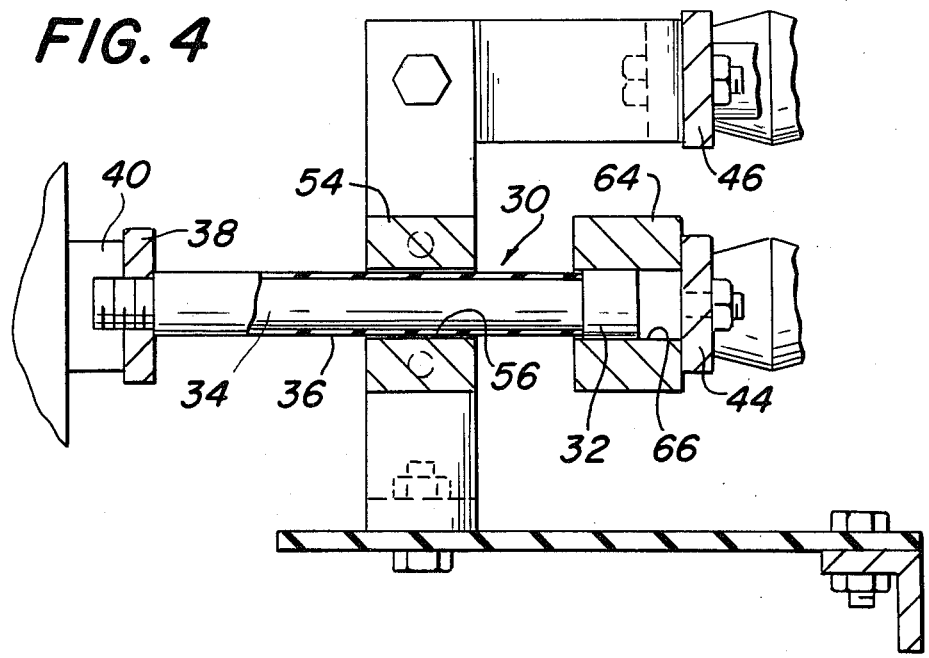
FIG. 4 is a sectional view taken along line 4—4 of FIG. 3, and showing the control unit of the apparatus connected to a positive potential.
Figure 5:
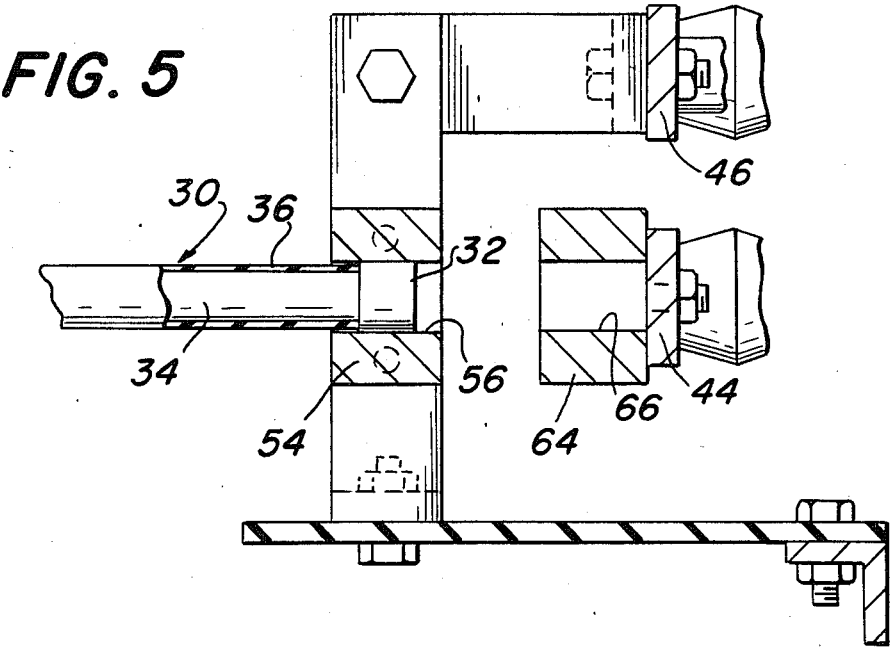
FIG. 5 is a sectional view similar to that of FIG. 4, but showing the control unit connected to a negative potential.

Referring to FIGS. 3 through 5, the connector 30 of the control unit 14 is adapted to be connected to either bus 44, which is maintained at a positive potential, or to bus 46, which is maintained at a negative potential. A pair of conventional constant potential power source supplies (not shown) are employed to establish the positive and negative potentials, respectively, along the respective buses 44 and 46. These constant power source supplies are well known in the art, and can be of the type schematically illustrated in Buerkel U.S. Pat. No. 3,452,211, which patent already has been incorporated herein by reference. In an exemplary construction the constant potential power source can be Model 504 (500 ampere output), Model 1004 (1,000 ampere output) or Model 1504 (1,500 ampere output), all of which are manufactured by Walker Power Corporation in Warner, N.H.

Referring to FIGS. 3 through 5, each of the buses 44 and 46 is connected through insulating spacers 48 to rear frame members 50 of the stationary support 12. A male connector 52 for receiving a female connector (not shown) from a constant potential power supply, operating at a negative potential, is threadedly connected to the bus 46, as can be seen best in FIG. 3. A similar male plug connecter 53 is threadedly connected to the positive bus 44 for receiving a female connector (not shown) from a second constant potential power supply, operating at a positive potential.

As can be seen best in FIGS. 3 through 5, a female connector, in the form of a conductive block 54 having a cylindrical passage or bore 56 therethrough is connected to the bus 46 through two pair of L-shaped brackets 58 and 60. These brackets are connected to each other and to the bus 46 and a horizontal, insulating supporting plate 62. The plate 62 either forms a part of, or is attached to a frame element of the fixed support 12.

A female connector 64, substantially identical to the connector 54, is electrically secured directly to the positive bus 44. This female connector 64 is in the form of a conductive block having a cylindrical passage or bore 66 which is axially aligned with the bore 56 of the female connector 54.

Referring specifically to FIG. 4, the control unit 14 is shown in its first position, with the conductor tip 32 of the connector 30 electrically engaging the inner surface of the bore 66 of the connector 64. In this manner the control unit is connected to the positive potential provided to the bus 44.

Figure 8:
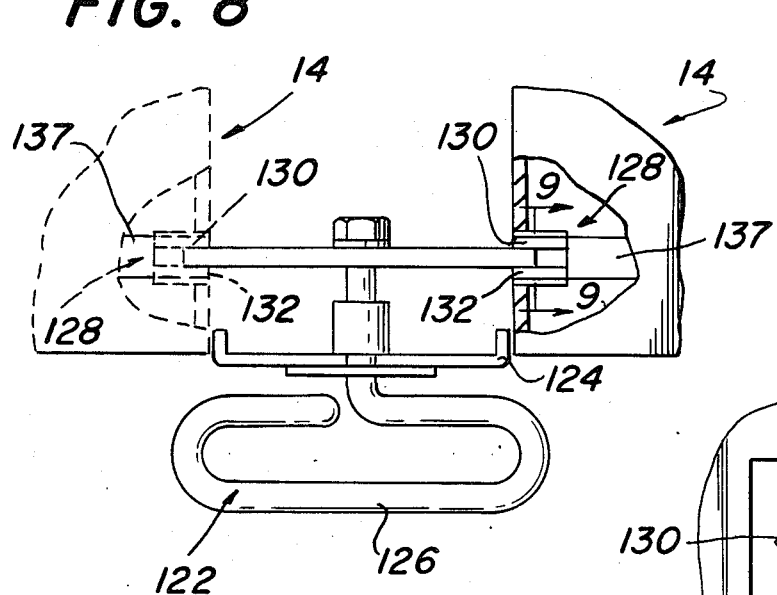
FIG. 8 is an enlarged fragmentary view of the circled portion of FIG. 2, but showing the "ganging" connector disposed ninety degrees to that shown in FIG. 2.

It should be noted that the control unit 14 is fully inserted within the support 12 when it is in its first position, as is shown in FIGS. 1, 2 and 8. It also should be noted that since the insulated body section 34 of the conductive rod 30 is of a smaller diameter than the tip or head 32, it is retained out of engagement with the generally cylindrically bore 56 of the connector 54, when the tip or head 32 is electrically connected to the female connector 66. This arrangement prevents frictional wear of the insulating layer 36 as the body section of the conductor 30 is moved relative to the inner surface of the cylindrical bore 56, when the control unit 14 is moved to switch polarities.

Referring to FIG. 5, the control unit 14 is shown in a second position, located forwardly of the first position, wherein the control unit actually projects partially outside of the front frame member 70 of the support 12. In this position the control unit 14 is maintained in electrical contact with the negative potential impressed upon the bus 46. This connection is established by the electrical contact of enlarged tip 32 of connector 30 with the inner surface of the bore 56 of the female connector 54.

From the above discussion it should be apparent that the polarity applied to the control unit 14 is reversed by simply sliding the control unit 14 relative to the support member 12 between the first and second positions illustrated in FIGS. 4 and 5, respectively. In order to prevent either the intentional or inadvertent shifting, or reversal, of polarities during operation of the control unit, such as when a welding operation is being carried out, a unique safety feature is provided, as will now be described in greater detail.

Figure 6:
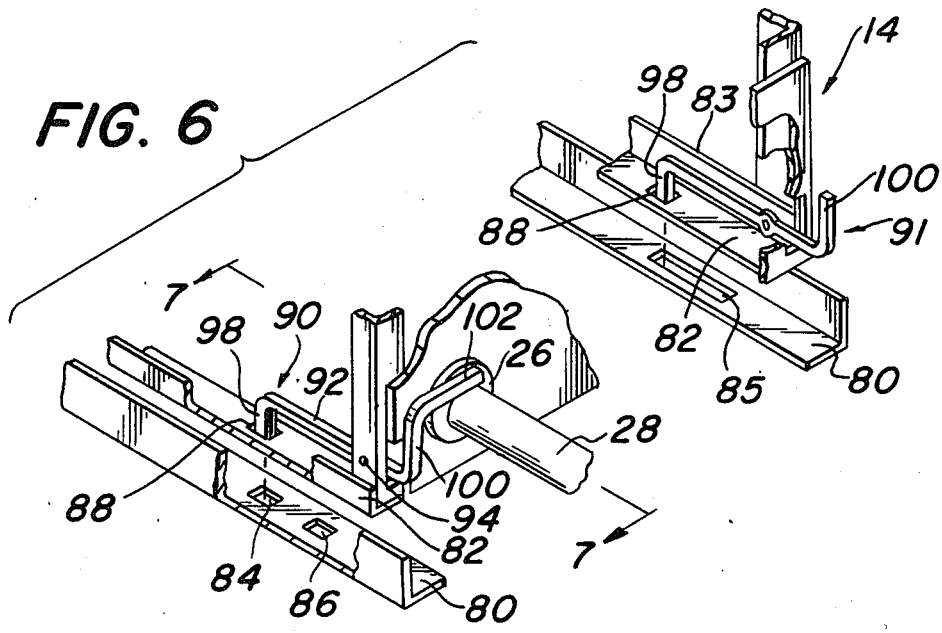
FIG. 6 is a fragmentary isometric view showing details of the mechanism for precluding either the intentional or inadvertent shifting of voltage polarities during operation of the control unit of this invention.
Figure 7:
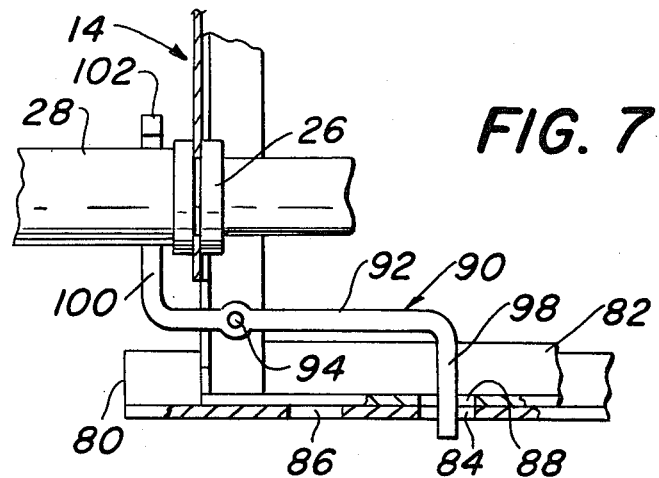
FIG. 7 is a sectional view taken along line 7—7 of FIG. 6.

Referring specifically to FIGS. 1, 6 and 7, lower horizontal frame members 80 and 81 of the support 12 constitute tracks for slidably receiving frame members 82 and 83 forming part of the control unit 14. The frame member 80 includes passageways 84 and 86 extending through a bottom wall thereof, and these passageways are laterally spaced-apart from each other to positively locate the control unit 14 in the first and second positions, respectively, for applying either a positive or negative potential to said control unit.

Referring specifically to FIG. 6, a passage 88 is provided through each of the frame members 82 and 83 of the control unit. The passage 88 in frame member 82 is adapted to align with the passageways 84 and 86 when the control unit is in its first position, coupled to a positive potential, or a second position, coupled to a negative potential. In the position shown in FIG. 6 the passage 88 of the frame member 82 is vertically aligned with the passageway 84 through member 80 of the support 12, with the carrier 14 being fully inserted within the support 12, and thereby electrically connected to the positive potential impressed upon the bus 44.

In accordance with a preferred feature of this invention a lever 90 is provided to properly position and lock the power unit 14 relative to the support 12 in the first and second positions necessary to establish the desired positive and negative potentials, respectively. In addition, the lever 90 is a safety lever to prevent movement of the control unit from either the first or second position to the other position when the control unit is in use.

Referring specifically to FIGS. 6 and 7, the lever 90, when in an operative position for preventing sliding movement of the carrier 14 relative to the support 12, includes a generally horizontal section 92 pivotally secured to a front frame section 96 of the carrier 14 through pivot connection 94 located intermediate the ends of said horizontal section. A vertical leg section 98 extends downwardly from the horizontal section 92 at a rear end thereof, and is adapted to be positioned into the passage 88, and either aligned passageway 84 or 86 of frame member 80 of the support 12 for positively locking the carrier 14 in either its first or second positions, respectively, relative to said support. An upwardly directed leg section 100 joins the horizontal section 92 at a forward end thereof, and a generally horizontal section 102 is disposed substantially perpendicular to the horizontal section 92, and extends laterally from an upper end of the upwardly directed leg section 100. This latter horizontal section 102 overlies the output socket 26 into which the cable 28 of a welding tool is removably insertable.

Still referring to FIGS. 6 and 7, when the cable 28 is retained within the output socket 26 it underlies the horizontal section 102 of the adjacent locking lever 90, to thereby prevent counterclockwise rotation of the lever, as viewed in FIG. 7. By precluding this counterclockwise rotation the downwardly directed vertical leg section 98 will be retained within the passage 88 located in the frame member 82 of the control unit 14, and in either the passageway 84 or 86 of the support 12, to thereby preclude sliding movemement of the control unit 14 from either the first or second position, as the case may be, to said other position. Thus, when the cable 28 is connected to the power output socket 26, which is required in order to provide power to the welding tool for carrying out a welding operation, it will be impossible for a person to either intentionally or inadvertently switch the polarity being applied to the control unit 14.

As can be seen in FIG. 6, the second lever 91 is similar to the lever 90, but is not employed as part of the safety feature. In other words, although the lever 91 normally is spring loaded so as to bias downwardly directed leg 98 into the passage 88 of frame member 83 and the elongate passageway 85 aligned therewith, it can be manually actuated through vertical section 100 to release the interconnection even when the control unit is in operation.

The main function of the locking member 91 is to prevent the control unit 14 from inadvertently being pulled out of the support 12, as the control unit is being moved from its first position to its second position. In other words, with the downwardly directed leg 98 of lever 90 spring biased into the elongate passageway 85 in support 12, the control unit 14 cannot be slid out of the supports although it can still be moved between its first and second positions. Of course, both levers 90 and 91 are manually biased in a clockwise direction, as viewed from the left of FIG. 6, to free downward projections 98 from aligned passageways in the support 12 to permit the control unit 14 to be removed for servicing.

As can be seen in FIG. 1, and as explained earlier, the control unit 14, in the illustrated embodiment, is adapted to provide a maximum of 250 amps of current for use in a welding operation. Specifically, this is achieved by applying 200 amps through the three switches 20, 22 and 24, and by applying an additional 50 amps through the rotary dial 18. However, for some applications it may be desirable to apply more than 250 amps, in which case additional amperage needs to be directed to the power output socket 26 of the control unit in order to permit the welding operation to be carried out. In order to achieve this result a unique "ganging" feature is employed as part of this invention.

Figure 9:
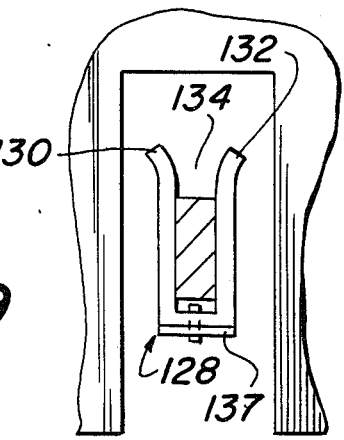
FIG. 9 is a sectional view taken along line 9—9 of FIG. 8.

Turning specifically to FIGS. 2, 8 and 9, the ganging feature of this invention is designed to permit adjacent control units 14 to be electrically interconnected to provide a doubling of the amperage available for a welding operation. Moreover, in the preferred embodiment of this invention, the ganging of adjacent control units is only permitted when the control units are both connected to a positive potential, i.e., when they are both fully inserted within the support 12 for interconnecting the conductive member 30 to the female connector 64 associated with the positive bus 44. This latter position of two adjacent control units 14 is illustrated in the fragmentary view of FIG. 8. It should be noted that FIG. 8 is an enlarged view of the circled portion shown in FIG. 2, but with the generally rectangular ganging connector or blade 120 oriented ninety degrees from the position illustrated in FIG. 2.

Referring specifically to FIGS. 2, 8 and 9, the ganging feature of this invention includes the electrically conductive blade 120, which is connected to a handle 122 that is rotatably mounted on the center, front frame section 124 of the support 12. This frame section 124 is located between the adjacent control units 14 that are intended to be electrically connnected together. The handle 122 includes a hand engaging section 126, in the form of a elongate, oblong section. This oblong section is disposed in a generally horizontal plane when the electrically conductive blade 120 is in electrical engagement with adjacent control units 14 (FIG. 8). In this position opposed ends of the hand engaging section actually overlie the opening in the frame 12, in which the control units 14 are retained. This is a very desirable feature of this invention, for reasons to be explained in detail hereinafter.

As can be seen best in FIGS. 8 and 9, each of the control units 14 includes a clip-type connector 128 aligned with an opening extending through a sidewall of each respective unit. These clip type connectors each have a pair of spaced legs 130, 132 defining a passageway 134 therebetween. A base 135 of the connector 128 is bolted to a conductive bus 137 which, in turn, is connected to the output of switches 18, 20, 22 and 24.

The passageways between the legs 130, 132 are linearly aligned with each other when the control units are both fully inserted within the support 12, thereby permitting the conductive blade 120 to be rotated into electrical engagement with both of the clip connectors (FIG. 8), to thereby electrically interconnect the two control units for increasing the positive current available for a welding operation. It should be noted that the connectors 128 are positioned 180° to each other to permit the blade 120 to be rotated into electrical engagement with them.

From the above explanation it should be apparent that if one of the control units 14 is connected to the negative bus, and thereby projects partially outside the support 12, and the other control unit is connected to the positive bus, then the connectors 128 associated with the control units will not be in axially alignment with each other or with the blade 120. Accordingly, it will not be possible to electrically connect the control units together.

Also, if either one or both of the adjacent control units 14 are in the second position, the portions of the control units extending outside of the support 12 will interfer with rotation of the hand gripping section 126, to thereby prevent the electrical conductive blade 120 from making electrical contact with any conductive elements of said adjacent control units. This is very important since it prevents the inadvertent or intentional shorting of the adjacent control units 14 when such adjacent units are connected to opposite potentials.

It is only when adjacent control units to be interconnected are fully inserted in the support 12, and thereby connected to a positive potential, that they can be ganged together. This is significant since the ganging of power units together for effecting a welding operation is only desired when a positive potential is being employed in the welding operation. As noted earlier, a positive potential is employed when the control units 14 are fully inserted within the support 12, to thereby electrically connect conductors 30 of the control units to the female connectors 64 associated with the positive bus 44.

Without further elaboration the foregoing will so fully illustrate my invention that others may, by applying current or future knowledge, adopt the same for use under various conditions of service.

I claim:

1. An electrical apparatus for selectively providing voltages of different polarities including:
   (a) a support;
   (b) a carrier slidably mounted on the support for movement between first and second positions, said carrier including electrical circuitry therein;
   (c) a positive source of power and a negative source of power; and
   (d) conductor means on the carrier for connecting the positive source of power to said circuitry when the carrier is in the first position and for connecting the negative source of power to the circuitry when the carrier is in said second position.

2. The electrical apparatus of claim 1 wherein the carrier unit is a power control unit employed as part of a welding system.

3. The electrical apparatus of claim 1 wherein the positive source and negative source of power are provided through electrical buses connected to the support.

4. The electrical apparatus of claim 3 wherein a pair of electrical connectors include surfaces for making electrical connection with the conductor means on the carrier, said surfaces being in axially alignment with each other and being connected to the positive bus and the negative bus, respectively.

5. The electrical apparatus of claim 4 wherein the conductor means on the carrier includes an elongate rod having a conductive rear tip, said conductive rear tip being electrically connectable to the electrical connector electrically connected to the positive bus when the carrier is in said first position, and being electrically connected to the electrical connector electrically connected to the negative bus when said carrier is in said second position.

6. The electrical apparatus of claim 1 including locking means for preventing relative sliding movement between the carrier and support when in a first orientation, and for permitting relative sliding movement between said carrier and said support when in a second orientation, means for preventing movement of said locking means from said first orientation to said second orientation when the carrier is in use.

7. The electrical apparatus of claim 6 wherein the carrier is a power control unit for supplying power to a tool, said power control unit including a power output for receiving a connection to said tool, said connection to said tool precluding movement of the locking means from said first orientation to said second orientation.

8. The electrical apparatus of claim 7 wherein said locking means is a lever including a first section overlying the power output of the control unit and said connection to the power output interfering with lever movement for preventing said lever from moving from the first orientation locking the carrier to the support, to a second orientation permitting movement of the carrier relative to the support.

9. The electrical apparatus of claim 6 wherein the locking means is operable for locking the carrier relative to said support when said carrier is in said first position, and for locking said carrier to said support when said carrier is in said second position.

* * * * *